US00RE41947E

(19) United States
(12) Reissued Patent
Holtzman

(10) Patent Number: US RE41,947 E
(45) Date of Reissued Patent: Nov. 23, 2010

(54) PRESSURE COMPENSATING ORIFICE FOR CONTROL OF NITROUS OXIDE DELIVERY

(76) Inventor: Barry Lyn Holtzman, 3907 Evergreen Rd., Eagle River, WI (US) 54521

(21) Appl. No.: 11/803,726

(22) Filed: May 15, 2007

Related U.S. Patent Documents

Reissue of:
(64) Patent No.: 6,938,841
Issued: Sep. 6, 2005
Appl. No.: 10/458,989
Filed: Jun. 10, 2003

(51) Int. Cl.
*B05B 1/30* (2006.01)
*B05B 1/00* (2006.01)
*A62C 31/02* (2006.01)

(52) U.S. Cl. ..... 239/570; 239/589
(58) Field of Classification Search ..... 239/570, 239/589, 592, 597, 601, 585.5, 585.4, 533.2, 239/DIG. 7, 533.9, 88–93
See application file for complete search history.

(56) References Cited

U.S. PATENT DOCUMENTS

| | | | | | |
|---|---|---|---|---|---|
| 1,952,816 | A | | 3/1934 | Mock | 239/488 |
| 2,562,742 | A | | 7/1951 | Rowe et al. | |
| 2,929,402 | A | * | 3/1960 | Streeter | |
| 3,047,208 | A | | 7/1962 | Henri | 417/174 |
| 3,210,938 | A | | 10/1965 | Mendez | |
| 3,664,768 | A | | 5/1972 | Mays et al. | 417/197 |
| 3,731,880 | A | * | 5/1973 | Williams | 239/585.1 |
| 3,877,450 | A | | 4/1975 | Meeks | |
| 4,046,492 | A | | 9/1977 | Inglis | 417/197 |
| 4,494,488 | A | * | 1/1985 | Wheatley | |
| 4,571,172 | A | | 2/1986 | Kendall-Tobias | |
| 5,240,404 | A | * | 8/1993 | Hemsath et al. | 431/9 |
| 5,269,275 | A | * | 12/1993 | Dahlgren | |
| 5,411,053 | A | | 5/1995 | Markham et al. | |
| 5,522,421 | A | | 6/1996 | Holt et al. | |
| 6,105,563 | A | * | 8/2000 | Patrick | |
| 6,240,911 | B1 | * | 6/2001 | Patrick | 123/585 |
| 6,758,198 | B1 | | 7/2004 | Suhre et al. | |
| 7,082,933 | B1 | | 8/2006 | Holtzman | |
| 2003/0062428 | A1 | | 4/2003 | Baasch et al. | |
| 2004/0025832 | A1 | | 2/2004 | Baasch et al. | |
| 2004/0084032 | A1 | | 5/2004 | Baasch et al. | |
| 2004/0139950 | A1 | | 7/2004 | Flynn et al. | |
| 2004/0250804 | A1 | | 12/2004 | Young | |
| 2006/0225671 | A1 | | 10/2006 | Atherley | |

OTHER PUBLICATIONS

Holtzman, Barry, Nitrous Oxide: Its Physics and Its Use, SnowTech, Oct./Nov. 2003, pp. 51–55.
Nitrous Oxide Systems, Inc., Product Catalog 2003, p. 11 bottom of center column., p. 47, p. 52.*
Nitrous Oxide Systems, Inc., nitrous pressure gauges installation instructions.*
Nitrous Express, Inc. Questions and Answers, web site 2003, p. 35 lines 11–12, p. 36 lines 35,36.*
Boondocker, About Us, web site 2003, last paragraph.*
Zex, What Makes Zex The Safest Nitrous Kit Around, web site 2003, first paragraph.*

* cited by examiner

*Primary Examiner*—Davis Hwu

(57) ABSTRACT

This invention is a variable orifice for controlling the mass flow rate of nitrous oxide used as an engine oxidizer, this orifice having an effective size, or area, which changes with changes in the nitrous oxide pressure applied to it. Several design parameters can be changed to provide the desired effective orifice area as a function of pressure. This variable orifice can be designed to maintain an essentially constant nitrous oxide delivery rate over a wide range of nitrous oxide pressures.

5 Claims, 1 Drawing Sheet

PRESSURE COMPENSATING ORIFICE FOR CONTROL OF NITROUS OXIDE DELIVERY

Figure 1:
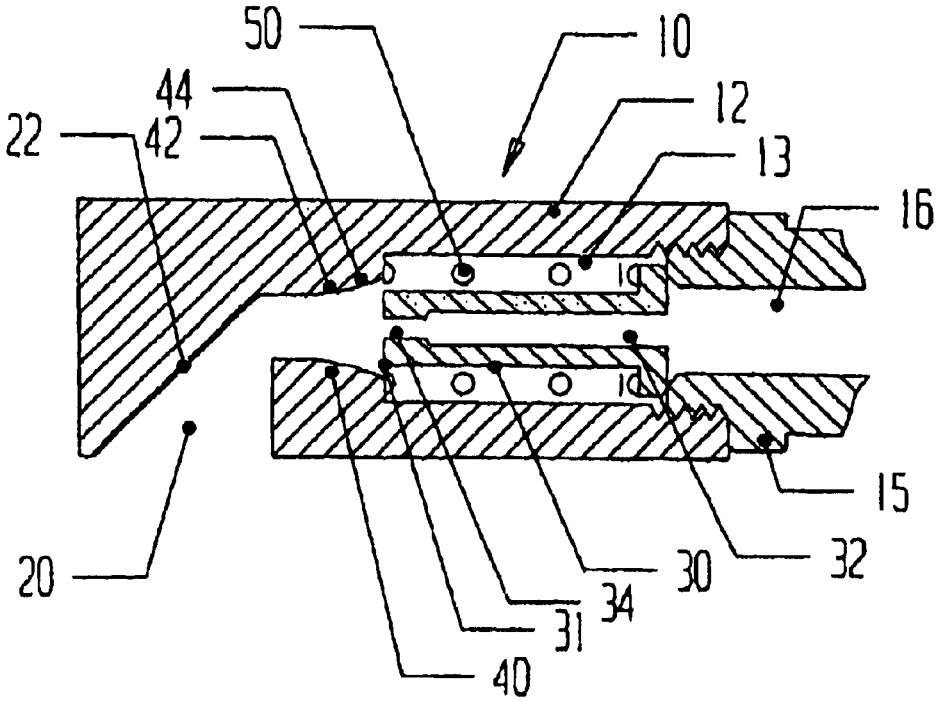

Matter enclosed in heavy brackets [ ] appears in the original patent but forms no part of this reissue specification; matter printed in italics indicates the additions made by reissue.

This invention is an orifice for controlling the mass delivery rate of nitrous oxide, this orifice having an effective area which changes with nitrous oxide pressure. This orifice can be designed to provide an essentially constant nitrous oxide delivery rate over a wide range of nitrous oxide pressure. This variable orifice is especially useful in liquid nitrous oxide delivery systems which are an engine oxidizing agent because changes in the mass delivery rate of nitrous oxide can reduce engine power increase, waste fuel or nitrous oxide, increase the level of harmful emissions, and damage the engine.

BACKGROUND DESCRIPTION OF PRIOR ART

Nitrous oxide presently has many uses. If inhaled it has anesthetic properties. Because it is an oxidizing agent, it can be introduced into an engine's induction tract causing "oxygen enrichment", allowing for the addition of supplemental fuel, thereby increasing the engine's power output. In both of these applications it is normally beneficial to have a nitrous oxide delivery system which can maintain a desired constant nitrous oxide mass delivery rate.

A property of nitrous oxide which makes this constant mass delivery rate difficult to obtain is the relatively large change in nitrous oxide bottle pressure as a function of the temperature of the nitrous oxide in the storage bottle. Nitrous oxide at normal atmospheric temperatures and pressures is a gas. It is stored in a bottle under high pressure, this high pressure raising its boiling point, causing some of the nitrous oxide to liquefy. In the bottle, therefore, the liquid nitrous oxide is in equilibrium with its vapor, and the vapor pressure of the nitrous oxide at a particular bottle temperature establishes the bottle pressure. In other words, the bottle pressure is essentially equal to the nitrous oxide vapor pressure, this vapor pressure being a function of temperature. For instance, liquid nitrous oxide stored in a bottle establishes a bottle pressure of approximately 2.76E07 dynes/cm^2 (400 pounds/ in^2 (PSI)) at −9° C. (20° F.) nitrous oxide temperature, but rises to approximately 5.52E07 dynes/cm^2 (800 PSI) at 24° C. (75° F.).

Another consideration which makes this constant mass delivery rate difficult to obtain is the fact that as nitrous oxide leaves the storage bottle, the temperature of the nitrous oxide inside the bottle decreases due to the change of enthalpy. This temperature reduction occurs rapidly causing a rapid decrease in bottle pressure which can result in a rapid decrease in mass delivery rate.

Nitrous oxide delivery systems can be divided into two types, vapor delivery systems and liquid delivery systems, determined by whether the nitrous oxide leaves the bottle primarily as a vapor or liquid. Nitrous oxide bottles contain a discharge valve at this top and they may contain a siphon tube, a tube which extends from the bottle's valve (at the bottle's top) to the bottle's bottom. A nitrous oxide bottle without a siphon tube if oriented so the valve is elevated relative to the bottle's bottom will discharge essentially only nitrous oxide vapor (the liquid of course is heavier than the vapor and lies at the bottom of the bottle and does not exit the valve). If oriented so the valve is lower than the bottom it will discharge essentially only nitrous oxide liquid. The reverse is true for a bottle with a siphon tube, discharging principally liquid nitrous oxide if its valve is elevated but vapor if its valve is low.

Nitrous oxide used as an anesthetic, for instance, uses a vapor delivery system. Liquid nitrous oxide, when released at atmospheric pressure, boils at a temperature of −88° C. (−172° F.), and the resulting cold vapor would be uncomfortable sprayed against a patient's face. In vapor delivery systems, the boiling occurs in the bottle and the resulting vapor which is released has been warmed by the bottle and delivery system before contacting the patient. Another reason is that conventional flow regulation means used to control the delivery rate of a gas, such as a pressure regulator and discharge orifice, can be used to control the nitrous oxide mass delivery rate in a vapor delivery system.

Nitrous oxide systems used as an oxidizing agent to increase an engine's power output use a liquid delivery system, one reason being opposite to that presented above for the vapor system for anesthetic use. In this case the "patient" is the engine and cold nitrous vapor delivered to this "patient" is beneficial due to its relatively high density. Injecting extremely cold nitrous oxide vapor into the engine's induction tract displaces a relatively small amount of the air which is normally drawn into the engine. If a vapor delivery system were used, the warmer nitrous oxide vapor would displace a relatively large amount of air, reducing total engine cylinder mass of fuel and oxygen relative to that attained with a liquid system, and performance would be reduced. Therefore, in nitrous oxide systems used as an engine oxidizing agent, liquid delivery systems are used and the nitrous oxide exists as principally a liquid until just before it is injected into the engine, taking best advantage of the temperature reduction in the nitrous oxide as it vaporizes.

In a nitrous oxide liquid delivery system used to increase engine power, use of a pressure regulator and discharge orifice to control mass delivery rate is not effective. When the regulator lowered the pressure of the liquid nitrous oxide from the bottle pressure to the regulated design pressure, a portion of the nitrous oxide would change from liquid to vapor to cool the nitrous oxide to the lower boiling point at the lower pressure. The nitrous oxide existing after passing through the regulator would therefore be a mixture of liquid and vapor, the proportion of liquid to vapor depending on the relationship between the unregulated bottle pressure and the regulated design pressure. The mass density at the entrance to the discharge orifice would be a function of this liquid/vapor proportion and therefore the mass delivery rate would still depend on bottle pressure. Since a pressure regulator and orifice does not maintain the desired constant mass delivery rate in a liquid delivery system, present liquid systems used to increase engine power use a fixed orifice to control mass delivery rate, this fixed orifice normally being located in a spray nozzle.

In a liquid nitrous oxide delivery system which uses a fixed orifice to control mass flow, a change in nitrous oxide storage bottle pressure results in a change in nitrous oxide delivery rate. As the liquid nitrous oxide moves through the conduits, valves, and fittings of the delivery system to the main controlling orifice, pressure drops in the connecting lines, valves, and fittings result in some vaporization of the nitrous oxide. Therefore, as the nitrous oxide enters the controlling jet, or orifice, the nitrous oxide is a mixture of liquid nitrous oxide and nitrous oxide vapor. Normally, the nitrous oxide delivery system lines, valves, and fittings are sized to provide minimal pressure drop and consequent vaporization, and therefore the nitrous oxide present at the inlet to the limiting jet or orifice is mostly in the liquid state.

Presently, manufacturers of liquid delivery systems used to increase engine power caution their users concerning the effect of changing bottle pressure caused by changing nitrous oxide temperature, and offer several solutions to keep the nitrous oxide delivery rate relatively constant. One solution is to change the nitrous oxide jet (with fixed orifice) with changes in bottle temperature to maintain the design mass delivery rate, but this is time consuming and can require continual adjustment. Another solution is to maintain the bottle at a fixed temperature to maintain its pressure at a "design" pressure. Manufactures offer thermostatically controlled bottle heaters attempting to maintain this design pressure, but these heaters are expensive, require a relatively large power source which may not be available on smaller recreational vehicles, and the bottle's thermal time constant can present application limitations. For instance, these bottle heaters cannot respond fast enough to prevent the drop in nitrous oxide pressure which results from then nitrous oxide cooling associated with nitrous oxide delivery discussed above. Another solution is described in U.S. Pat. No. 4,494,488 To Wheatley (1985) wherein an additional bottle of high pressure nitrogen gas is used to maintain a relatively constant nitrous oxide pressure. This requires the use of an additional high pressure bottle and regulator which adds weight, cost, and complexity to the nitrous oxide delivery system.

Other applications let the nitrous oxide pressure change, resulting in a nitrous oxide delivery rate change, but adjust the supplemental fuel enrichment in order to keep the fuel/oxygen ratio correct. In U.S. Pat. No. 6,105,563 to Patrick (2000), a nitrous oxide pressure signal is used to affect the amount of supplemental fuel delivery. In another system, dynamic pressure of the exiting nitrous oxide affects the pressure in the engine's carburetor float bowls, thereby enrichening the fuel mixture in relation to the nitrous oxide bottle pressure. These systems and all similar systems which allow the nitrous oxide delivery rate to vary with bottle pressure but adjust supplemental fuel flow are systems in which the engine's power increase due to the application of nitrous oxide varies with nitrous oxide bottle pressure. At high bottle temperatures and consequently high bottle pressures, nitrous oxide flow rate is relatively high, supplemental fuel flow is relatively high, and the supplemental power is relatively high. When the bottle temperature and pressure is lower, the supplemental power is relatively lower. In other words, the engine's power when on nitrous oxide is a function of the temperature of the nitrous oxide in the bottle, and this is not normally desirable.

In other systems, which are usually less expensive systems, the nitrous oxide mass delivery rate is allowed to vary with bottle temperature and pressure, the fuel flow is not adjusted for this change, and the engine is just allowed to run leaner when the nitrous oxide pressure is higher and richer when it is lower. These systems cannot delivery optimum power because of the danger of causing engine damage when the nitrous oxide pressure is high due to too much oxygen enrichment with resulting leaner fuel mixture.

OBJECTS AND ADVANTAGES

It is an object of this invention to provide in a nitrous oxide delivery system used for engine power enhancement a variable orifice for controlling nitrous oxide mass delivery which has an effective area which changes with changes in nitrous oxide pressure.

It is a further object of this invention to provide an orifice for controlling nitrous oxide mass delivery rate in a liquid delivery system which is specifically designed to be pressure compensated, maintaining a relatively constant nitrous oxide delivery rate over a range of nitrous oxide pressures.

Still further objects and advantages will become apparent from a consideration of the ensuing description and drawings.

DRAWING FIGURES

Figure 2:
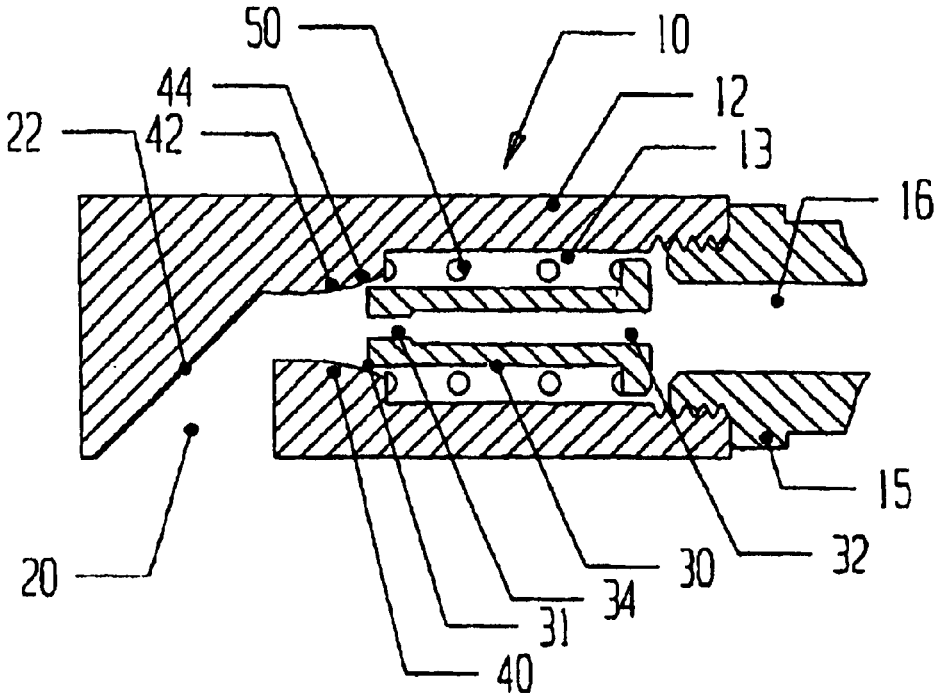

FIGS. 1 and 2 show a cross-sectional view of a nitrous oxide nozzle assembly containing a variable orifice of this invention taken in a plane containing the axis of the nozzle. FIG. 1 shows the nozzle with no pressure applied to its inlet; FIG. 2 with a pressure applied.

REFERENCE NUMERALS IN DRAWINGS

10 nozzle assembly
12 nozzle body
13 body bore
15 nozzle inlet fitting
16 inlet passage
20 nozzle outlet
22 deflector surface
30 plunger
31 plunger tip
32 plunger passage
34 plunger orifice
40 tapered bore section
42 high pressure cone
44 low pressure cone
50 spring

DESCRIPTION AND OPERATION—FIGS. 1 and 2

FIG. 1 shows a nozzle assembly 10 having a variable orifice of the present invention, the nozzle in this figure having no pressure applied. Assembly 10 contains a body 12 having an inlet fitting 15 threadably engaged to body 12. Fitting 15 has an inlet passage 16 and a suitable means for connection to a liquid nitrous oxide source, not shown. Nozzle assembly 10 has an outlet 20 with an optional deflecting surface 22 to provide the desired outlet spray pattern. Body 12 has a bore 13 containing a moveable plunger 30 and a spring 50, the positions of plunger 30 and spring 50 shown in their positions when inlet 16 of nozzle assembly 10 is not pressurized. Plunger 30 has an optional passage 32 leading to an optional plunger orifice 34. Plunger 30 has a tip 31 which can move relative to a tapered bore section 40, the relative position established by the upstream pressure of the nitrous oxide acting on plunger 30 and restrained in movement by spring 50. Tapered bore section 40 is shown by way of example containing two conical sections, a high pressure cone 42 and a low pressure cone 44. FIG. 2 is identical to FIG. 1 except it shows a position of plunger 30 and spring 50 when inlet 16 is pressurized.

The nitrous oxide source, not shown, normally includes a storage bottle oriented to deliver principally liquid nitrous oxide, a normally closed solenoid valve with switching means for opening, and interconnecting tubing and fittings. When the switching means opens the solenoid valve, nitrous oxide under pressure enters nozzle 10 through passage 16, thereby pressurizing passage 16 and bore 13 upstream of plunger 30. The nitrous oxide source is normally designed so that its various fittings, tubes, and valves have relatively small pressure drops in operation, and therefore the pressure existing in passage 16 and the upstream section of bore 13 is only slightly less than the pressure existing in the nitrous oxide storage bottle thereby insuring that the nitrous oxide is principally a liquid as it enters nozzle 10.

The flow of nitrous oxide therefore is from the storage bottle, through the solenoid valve, and finally through nozzle 10, the flow rate being affected by the effective orifice size of nozzle 10. The orifice contained in nozzle 10 has an effective area which is determined by the additive areas of any and all parallel flow paths for nitrous oxide multiplied by their respective discharge coefficients, numbers which represent how closely their-flow is to isentropic. Discharge coefficients are always less than unity, typically 0.65 to 0.95. As the liquid nitrous oxide at relatively high pressure upstream of the effective orifice of nozzle 10 passes through the effective orifice, the pressure decreases and the nitrous oxide changes from a liquid to a colder vapor (gas) as it exits the effective orifice.

When the solenoid valve is opened, the pressure existing in bore 13 upstream of plunger 30 exerts a force on plunger 30 in a direction to compress spring 50. At any given level of applied pressure, plunger 30 and tip 31 have a position in which the force on plunger 30 caused by the pressure in bore 13 upstream of plunger 30 is balanced by the force of spring 50 on plunger 30. It can be seen, therefore, that as pressure is applied to plunger 30, tip 31 will move deeper into tapered bore section 40, thereby decreasing the clearance between tip 31 and tapered bore section 40, thereby decreasing the effective orifice size of nozzle 10. Lower pressures in bore 13 result in a larger clearance between tip 31 and tapered bore section 40 than that which exists at higher pressures and therefore the effective orifice size of nozzle 10 changes with a change in pressure applied to it. For instance, the effective orifice size of the un-pressurized nozzle 10 shown in FIG. 1 is larger than the effective orifice size of the pressurized nozzle 10 shown in FIG. 2.

If the effective orifice area of nozzle 10 changes with changes in applied nitrous oxide pressure, the relationship between the nitrous oxide pressure and flow rate will be affected. Many relationships between delivery rate and pressure can be achieved using different designs of nozzle 10, even, if desired, a relationship in which the delivery rate decreases with an increase in pressure. Specifically, nozzle 10 can also be designed so the nitrous oxide flow rate is approximately constant even when nitrous oxide pressure changes.

Mass flow rate of a liquid through an orifice is proportional approximately to the product of the effective orifice area (the orifice area times its discharge coefficient) times the square root of the product of the pressure across the orifice times the density of the liquid upstream of the orifice. Since most liquids have relatively constant density over normally encountered pressures, for these liquids mass flow rate through a given effective orifice area changes approximately directly with the square root of the pressure across the orifice only (since the density is essentially constant). Nitrous oxide is different; the density of liquid nitrous oxide in equilibrium with its vapor actually decreases as the pressure increases. For instance, at a temperature of −18° C. (0° F.) which corresponds to a pressure of 19.3E06 dynes/cm^2 (279 PSI), the density of liquid nitrous oxide in equilibrium with its vapor is 0.99 grams/cm^3. At a temperature of 32° C. (90° F.) which is a pressure of 66.3E06 dynes/cm^2 (961 PSI) the density drops to 0.65 grams/cm^3. This density change must be considered when designing nozzle 10 to control the mass flow rate of nitrous oxide. If for instance nozzle 10 is controlling the mass flow rate of liquid nitrous oxide, and if this flow rate is to be essentially constant over a range of upstream nitrous oxide pressure, then the effective orifice area of nozzle 10 at any given upstream pressure times the square root of the product of the pressure across the orifice (the upstream pressure less the corresponding downstream pressure) and the upstream density of the nitrous oxide liquid must be kept essentially constant. Since the density of liquid nitrous oxide in equilibrium with its vapor changes significantly with pressure, a design of nozzle 10 which provides constant mass flow rate of nitrous oxide would not provide constant mass for rate for almost any other liquid.

There are several design variables which can be used to obtain the desired relationship between delivery rate and pressure. The first is the rate of spring 50. A stiffer spring will cause relatively less movement of plunger 30 than a stiffer spring, causing a relatively smaller rate of change of effective orifice area as a function of pressure. Another parameter is the shape of tapered bore section 40. It has been found that two cones of different tapers and lengths can be used to provide a close match to the desired result. Cones 42 and 44 have been named high pressure and low pressure respectively because tip 31 will be in cone 42 at sufficiently high pressure and it will be in cone 44 at sufficiently low pressure. It has been found that when the desired effect is achieved high pressure cone 42 will normally have a more shallow taper than low pressure cone 44 as shown in the figures. It has also been found that tapered bore section 40 can have a continuously changing shape, or spline, in which its taper, or included angle, normally gradually decreases in going from a low pressure position to a higher pressure position.

It has been found desirable in some cases to include plunger orifice 34 in plunger 30. If orifice 34 is used, this orifice essentially provides an alternate flow path for nitrous oxide in addition to the path provided by the clearance between tip 31 and tapered bore section 40. In this case the effective orifice size of nozzle 10 therefore contains two parts, the fixed effective area of orifice 34 plus the effective area determined by the clearance between tip 31 and tapered bore section 40. These two parallel flow paths can have different discharge coefficients so their areas may not be directly additive, but the overall effective orifice area can easily be determined by testing.

A nozzle similar to assembly 10 was constructed, connected to a conventional liquid nitrous oxide source, and tested for flow at several nitrous oxide bottle pressures. In this nozzle assembly 10, high pressure cone 42 had a tapered of 1 degree/side (2 degree included angle) and low pressure cone 44 had a taper of 2 degrees per side (4 degree included angle). Tip 31 made the transition from cone 44 to cone 42 at a pressure of approximately 2.9E07 dynes/cm^2 (425 PSI) nitrous oxide pressure. Tip 31 had a diameter of approximately 2.54 mm (0.1 inch), plunger orifice 34 had a diameter of 0.51 mm (0.020 inch), and spring 50 had a rate of 5.95E06 dynes/cm (34 pounds/inch). At 2.07E07 dynes/cm^2 (300 PSI) nitrous oxide bottle pressure, a mass flow rate of 12.6 grams/second was recorded; at 4.83E07 dynes/cm^2 (700 PSI) the mass flow rate was 11.8 grams/second. A more than doubling of the applied nitrous oxide pressure to nozzle 10 with an orifice with a variable effective area of this invention actually resulted in a decrease in nitrous oxide flow of 6%. This shows the ability of this invention to affect the nitrous oxide mass flow rate as a function of nitrous oxide pressure, enabling the orifice to deliver an essentially constant mass flow over a wide range of applied pressures, or even to cause a decreasing flow rate with increasing pressure if desired.

The response time of this variable orifice is fast enough to provide pressure compensation even for changes in nitrous oxide pressure during delivery. The mass of plunger 30 in this example was a little over one gram, and combined with the spring rate used, the response time of the orifice is in the range of 0.0015 sec.

SUMMARY, RAMIFICATION, AND SCOPE

Accordingly, the reader will see that this invention is an orifice for controlling the mass flow rate of nitrous oxide in a delivery system used to oxidize an engine, this orifice having an effective size, or effective area, which changes with changes in the nitrous oxide pressure applied to it. A plunger is positioned in a tapered bore section by the pressure applied to the plunger restrained by a spring. Several design parameters can be changed to provide the desired effective orifice area change as a function of pressure, such as spring rate, taper design, and size of an optional fixed orifice. This variable orifice can be designed to maintain an essentially constant nitrous oxide delivery rate over a wide range of pressures.

Although the description above contains many specificities, these should not be construed as limiting the scope of the invention but as merely providing illustrations of some of the presently preferred embodiments of this invention. For instance, the tapered section of the bore is described as having conical shapes, but other shapes (splines) can be used to achieve any desired relationship between effective orifice area and pressure. A tapered section having two differently tapered cones is discussed and shown, but other numbers of cones or other shapes can be used to obtain the desired effect. Also, the spring is shown as a coil spring, but other spring types such as disc springs, wave springs, or tapered springs may be used. Also, the variable orifice is shown as being an integral part of a nozzle assembly, but it may be manufactured separately from the nozzle. Also, the principle of this invention includes a nozzle having a bore section which is uniform in area but a plunger which is tapered, or a combination of a tapered plunger and a tapered bore section. Thus, the scope of the invention should be determined by the appended claims and their legal equivalents, rather than by the examples given.

What is claimed is:

[1. An orifice for control of mass delivery rate of nitrous oxide, said nitrous oxide being used as an engine oxidizer, said orifice having an effective area for flow of said nitrous oxide, said effective area of said orifice being the product of the area of said orifice times the discharge coefficient of said orifice, said orifice having a first effective area at application of a first pressure of said nitrous oxide upstream of said orifice, said orifice having a second effective area at application of a second pressure of said nitrous oxide upstream of said orifice, said first pressure of said nitrous oxide being operationally higher than said second pressure of said nitrous oxide, and wherein said first effective area and said second effective area are operationally different.]

[2. The orifice of claim 1, wherein said first effective area is less than said second effective area.]

[3. The orifice of claim 1, wherein said orifice delivers a first mass delivery rate of said nitrous oxide at said first pressure of said nitrous oxide and said orifice delivers a second mass delivery rate of said nitrous oxide at said second pressure of said nitrous oxide, and wherein said first mass delivery rate and said second mass delivery rate are essentially equal.]

[4. The orifice of claim 1, wherein said orifice is contained in a nozzle for delivery of said nitrous oxide.]

[5. The orifice of claim 1, wherein said effective area of said orifice contains a variable area of a variable orifice and a fixed area of a fixed orifice.]

[6. The orifice of claim 1, wherein said effective area of said orifice contains a variable area determined by a moveable member in a bore.]

[7. The orifice of claim 6, wherein said moveable member has its movement affected by the force of a spring.]

[8. The orifice of claim 6, wherein said moveable member has its movement affected by the pressure of said nitrous oxide.]

[9. The orifice of claim 6, wherein said bore has a taper which in operation affects said effective area of said orifice.]

[10. The orifice of claim 9, wherein said taper has a first included angle at a first effective position of said moveable member and a second included angle at a second effective position of said moveable member.]

[11. The orifice of claim 6, wherein said moveable member has a taper which in operation affects said effective area of said orifice.]

[12. The orifice of claim 6, wherein said bore has a taper which in operation affects said effective area of said orifice and said moveable member has a taper which in operation affects said effective area of said orifice.]

[13. The orifice of claim 1, wherein said nitrous oxide is principally a liquid in equilibrium with its vapor when upstream of said orifice, said orifice having a first pressure difference which is said first pressure of said nitrous oxide upstream of said orifice less a corresponding first downstream pressure, said orifice having a second pressure different which is said second pressure of said nitrous oxide upstream of said orifice less a corresponding second downstream pressure, said orifice having a first mass delivery rate essentially determined by the product of a proportionality constant times said first effective area of said orifice times the square root of the product of said first pressure different times the square root of the pressure of nitrous oxide upstream of said orifice, and said orifice having a second mass delivery rate essentially determined by the product of said proportionality constant times said second effective area of said orifice times the square root of the product of said second pressure difference times the density of said nitrous oxide at said second pressure of said nitrous oxide upstream of said orifice.]

[14. The orifice of claim 13, wherein said first mass delivery rate and said second mass delivery rate are essentially equal.]

[15. An orifice for control of mass delivery rate of nitrous oxide, said nitrous oxide being used as an engine oxidizer, said orifice having an effective area for flow of said nitrous oxide, said effective area of said orifice being the product of the area of said orifice times the discharge coefficient of said orifice, said orifice having a first effective area at application of a first pressure of said nitrous oxide upstream of said orifice, said orifice having a second effective area at application of a second pressure upstream of said orifice, and wherein said orifice delivers a first mass delivery rate of said nitrous oxide at said first pressure of said nitrous oxide and said orifice delivers a second mass delivery rate of said nitrous oxide at said second pressure of said nitrous oxide, and wherein the ratio of said first mass delivery of said nitrous oxide rate to said second mass delivery rate of said nitrous oxide is less than the ratio of said first mass delivery rate of said nitrous oxide to a third mass delivery rate of said nitrous oxide, said third mass delivery rate being at said second pressure of said nitrous oxide and said first effective area of said orifice.]

*16. An apparatus to control mass flow rate of nitrous oxide, the apparatus comprising:*

*a body with an inlet for admission of pressurized nitrous oxide and an outlet for delivery of the nitrous oxide to an engine for use as an oxidizer, the pressurized nitrous oxide at the inlet having a first pressure and a second higher pressure;*

*a moveable member located within the body;*

*a pressure force on the moveable member resulting from the pressurized nitrous oxide, the pressure force being a first pressure force when the nitrous oxide pressure has the first pressure and a second pressure force when the nitrous oxide has the second pressure;*

*a spring which applies a spring force to the moveable member which opposes the pressure force;*

*a first position of the moveable member with respect to the body which is the position at which the spring applies a first spring force to the moveable member which essentially equally opposes the first pressure force on the moveable member;*

*a second position of the moveable member with respect to the body which is the position at which the spring applies a second spring force to the moveable member which essentially equally opposes the second pressure force on the moveable member;*

*whereby an orifice is established by the body and the moveable member, the orifice having a first area for flow of nitrous oxide when the moveable member is in the first position and a second area for flow of nitrous oxide when the moveable member is in the second position.*

*17. The apparatus of claim 16 wherein the first area for flow of nitrous oxide is larger than the second area for flow of nitrous oxide.*

*18. The apparatus of claim 16 wherein the moveable member moves in a tapered passage in the body.*

*19. The apparatus of claim 18 wherein the orifice is established by the tapered passage and the moveable member.*

*20. The apparatus of claim 16 wherein the mass flow rate of nitrous oxide has a first mass flow rate when the nitrous oxide has the first pressure and the moveable member is in the first position and a second mass flow rate when the nitrous oxide has the second pressure and the moveable member is in the second position, and the first mass flow rate is greater than the mass flow rate which would exist with the first pressure of nitrous oxide if the moveable member was in the second position and the second mass flow rate is smaller than the mass flow rate which would exist with the second pressure of nitrous oxide if the moveable member was in the first position.*

* * * * *